US008454003B2

(12) United States Patent
Kaiser

(10) Patent No.: US 8,454,003 B2

(45) Date of Patent: Jun. 4, 2013

(54) CLAMPING DEVICE

(75) Inventor: Richard Kaiser, Bad Homburg vor der Hoehe (DE)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 13/450,931

(22) Filed: Apr. 19, 2012

(65) Prior Publication Data

US 2012/0272782 A1 Nov. 1, 2012

(30) Foreign Application Priority Data

Apr. 28, 2011 (DE) ......................... 10 2011 018 987

(51) Int. Cl.
*B23Q 3/00* (2006.01)

(52) U.S. Cl.
USPC .................. 269/32; 269/24; 269/228; 269/27

(58) Field of Classification Search
USPC ............. 269/32, 24, 27, 228, 30, 201; 74/519
See application file for complete search history.

(56) References Cited

U.S. PATENT DOCUMENTS

| | | | | |
|---|---|---|---|---|
| 5,676,357 | A * | 10/1997 | Horn | 269/32 |
| 6,059,277 | A * | 5/2000 | Sawdon et al. | 269/24 |
| 6,612,557 | B2 * | 9/2003 | Sawdon et al. | 269/32 |
| 2004/0046299 | A1 * | 3/2004 | Migliori | 269/32 |
| 2004/0061268 | A1 * | 4/2004 | Sawdon | 269/32 |
| 2009/0283948 | A1 * | 11/2009 | Fukui et al. | 269/32 |
| 2012/0272782 | A1 * | 11/2012 | Kaiser | 74/519 |

FOREIGN PATENT DOCUMENTS

| | | |
|---|---|---|
| DE | 31 14 448 | 10/1982 |
| DE | 32 28 646 | 2/1984 |
| DE | 196 45 778 | 5/1998 |
| EP | 1 524 080 | 11/2007 |

* cited by examiner

*Primary Examiner* — Lee D Wilson

(74) *Attorney, Agent, or Firm* — Harness, Dickey & Pierce, P.L.C.

(57) ABSTRACT

A clamping device has a hollow shaft (1) rotatably mounted in a housing with a clamping element fastenable to the shaft and includes a lever arm (2) as part of a toggle lever mechanism. An intermediate element is articulated on both sides by the lever arm (2) and an axially movable final control element (4) of a drive element, respectively. An inner shaft (6), connected to a hand lever (5), is arranged in the hollow shaft (1). The inner shaft has a pin element (7) that extends through a link guide (8) on the hollow shaft (1). The inner shaft (6) can be operationally linked to the toggle lever mechanism. A spring element (9) tensions the inner shaft (6) against the hollow shaft (1) in the main axial direction. The spring element (9) is arranged in the interior of the hollow shaft (1).

10 Claims, 1 Drawing Sheet

CLAMPING DEVICE

CROSS-REFERENCE TO RELATED APPLICATIONS

This application claims the benefit and priority of German Patent Application No. 10 2011 018 987.4, filed Apr. 28, 2011. The entire disclosure of the above application is incorporated herein by reference.

FIELD

The disclosure relates to a clamping device and, more particularly, to a clamping device with a hollow shaft and a spring in the interior of the shaft.

BACKGROUND

A clamping device is known according to DE 196 45 778 A1. It has a hollow shaft (clamping arm shaft) that is rotatably mounted in a housing. A clamping element (clamping arm) is fastenable to the shaft. A lever arm (positioning extension) on the shaft provides a toggle lever mechanism. An intermediate element is articulated on one side with the lever arm and on the other side with an axially movable final control element (positioning rod) of a drive element. An inner shaft connected to a hand lever is arranged in the hollow shaft. The inner shaft has a pin element (positioning pin) extending through a link guide (link slot) on the hollow shaft. The pin element can be operationally linked to the toggle lever mechanism. A spring element, which tensions the inner shaft against the hollow shaft in the main axial direction, is positioned outside the housing.

As described in DE 196 45 778 A1, it is possible, using this design to alternately disengage the toggle lever mechanism with the aid of a hand lever or bring it into a so-called top dead center position, and in particular if the final control element of the drive element (pneumatic cylinder, hydraulic cylinder, electric drive, or the like) is movably unobstructed. In particular, the aspect is taken into consideration that in the case of a non-hollow clamping arm shaft, a torque introduction therein is unsuitable to take influence on the toggle lever mechanism.

SUMMARY

The disclosure improves a clamping device of the above mentioned type. In particular, the clamping device is a more compact structural form.

A clamping device of the above mentioned type includes a hollow shaft and a clamping element. The hollow shaft is rotatably mounted in a housing. The clamping element is fastenable with the shaft. The clamping element includes a lever arm and a toggle lever mechanism. An intermediate element is articulated on one side with the lever arm. The intermediate element is articulated on the other side with an axially movable final control element of a drive element. An inner shaft, connected to a hand lever, is arranged in the hollow shaft. The inner shaft has a pin element that extends through a link guide on the hollow shaft. The inner shaft can be operationally linked to the toggle lever mechanism. A spring element tensions the inner shaft against the hollow shaft in the main axial direction. The spring element is arranged in the interior of the hollow shaft.

Thus, according to the disclosure, the spring element is arranged in the interior of the hollow shaft.

In other words, the disclosure is distinguished in that the spring element, which was originally arranged externally of the housing on the hollow shaft (see in particular FIG. 5 of DE 196 45 778 A1), is now placed in the interior of the hollow shaft. Thus, the spring element is a coiled compression spring arranged in a ring gap between the inner shaft and the hollow shaft.

Further areas of applicability will become apparent from the description. The description and specific examples in this summary are intended for purposes of illustration only and are not intended to limit the scope of the present disclosure.

DRAWINGS

The clamping device according to the disclosure, including the advantageous refinements, is explained in greater detail with reference to the illustrations in the drawings of an exemplary embodiment.

DETAILED DESCRIPTION

Figure 1:
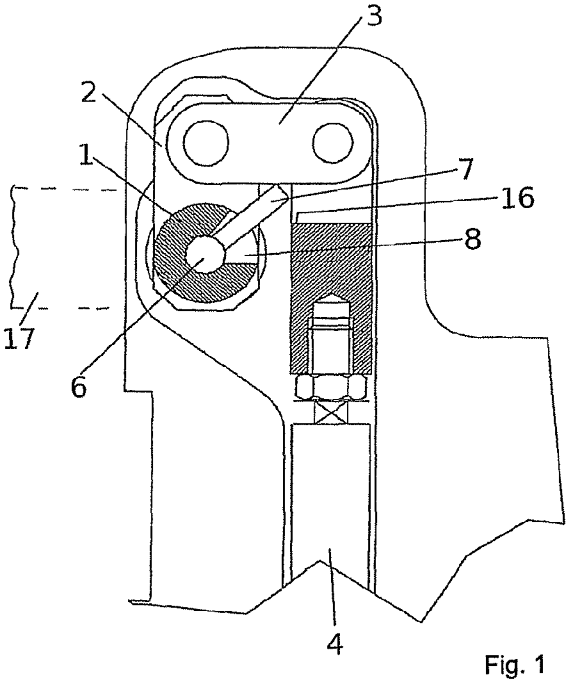
FIG. 1 is a cross-section view of a head part of the clamping device.
Figure 2:
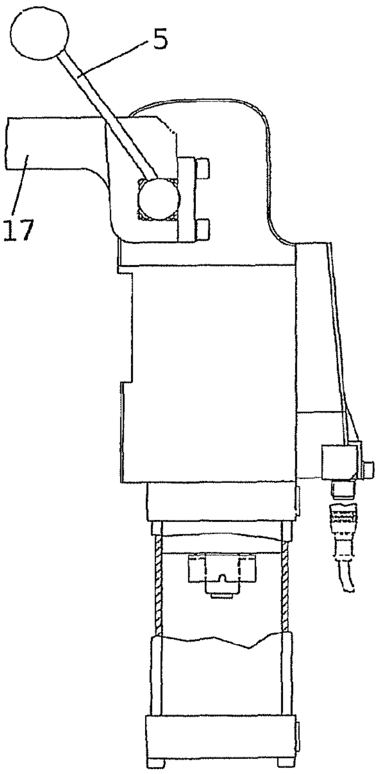
FIG. 2 is a side elevation view of the clamping device.

The clamping device shown in FIGS. 1 to 4 includes a hollow shaft 1 rotatably mounted in a housing. A clamping element, in particular, a clamping arm 17, is fastened in a rotationally-fixed manner to the shaft 1. The shaft 1 includes a lever arm 2 to implement a toggle lever mechanism. Like the clamping element, the lever arm 2 is also connected in a rotationally fixed manner to the hollow shaft 1. The shaft 1 is polygonal, preferably square, in cross section on the clamping arm side. Furthermore, an intermediate element 3 is articulated on one side with the lever arm 2, and on the other side, it is axially movable with a final control element 4 of a drive element.

Figure 3:
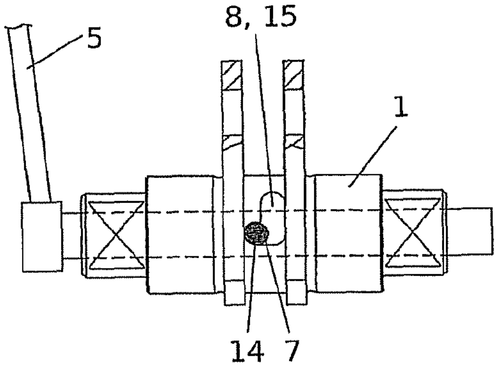
FIG. 3 is a top elevation view of the hollow shaft with an internal shaft and hand lever.

An inner shaft 6 is connected to a hand lever 5. The inner shaft 6 is arranged in the hollow shaft 1. The inner shaft has a pin element 7 that extends through a link guide 8 on the hollow shaft 1. The inner shaft 6 can be operationally linked to the toggle lever mechanism. A spring element 9 tensions the inner shaft 6 against the hollow shaft 1 in the main axial direction. The known link guide 8 has guide sections 14, 15 that are oriented on one side, in parallel, and on the other side, transversely, to the main axial direction of the hollow shaft 1 (see FIG. 3). The pin element 7 alternately interacts with the intermediate element 3 or the final control element 4. For this purpose, the final control element 4 is forked on the intermediate element side. A counter bearing 16, for the pin element 7, is arranged between the two fork parts (see FIG. 1). As also shown in FIGS. 1 and 3, the lever arm 2 is formed with a fork (or from two tabs) on the intermediate element side. The intermediate element 3 is articulated between two fork parts or tabs. As is obvious from FIG. 4, a cylindrical through hole 13 is provided in the hollow shaft 1 to receive the inner shaft 6. The inner shaft 6 protrudes out of the hollow shaft 1 on both sides.

The spring element 9 is preferably a coiled compression spring surrounding a portion of the inner shaft 6. The spring 9 is arranged in the interior of the hollow shaft 1. This measure has an advantage that the clamping device can be designed as a more compact overall design.

Figure 4:
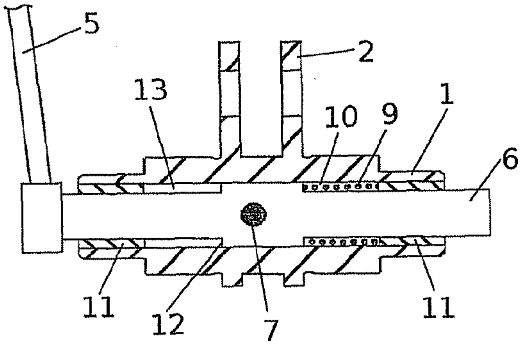
FIG. 4 is a cross-section view of the hollow shaft with an inner shaft and hand lever.

A ring gap space 10, to accommodate the spring element 9, is provided between the hollow shaft 1 and the inner shaft 6 as seen in FIG. 4. Two bushes 11 are arranged between the hollow shaft 1 and the inner shaft 6. One of the two bushes 11 is a counter bearing for the spring element 9. The internal diameter of the bush 11 corresponds to the external diameter of the inner shaft 6. Thus, the latter can be rotated easily in relation to the hollow shaft 1. Simultaneously, each bush 11 is connected in a friction-locked manner, for example, by a press-fit, to the hollow shaft 1.

The inner shaft 6 has a shaft shoulder 12 that acts as a counter bearing for the spring element 9. This shaft shoulder 12 provides a cylindrical support surface for the inner wall of the hollow shaft 1. The shaft shoulder 12 has an external diameter matching with the internal diameter of the hollow shaft 1. In addition, the external diameter of the bush 11 corresponds to the external diameter of the shaft shoulder 12. Finally, the pin element 7 is arranged in the area of the shaft shoulder 12 on the inner shaft 6.

The clamping device according to the disclosure functions as follows. Proceeding from the clamping position shown in FIG. 1, where the toggle lever mechanism is in top dead center position, a torque is transmitted to the inner shaft 6 through the hand lever 5. The inner shaft 6 rotates, at this moment, within the hollow shaft 1 until the pin element 7 touches the counter bearing 16 on the final control element 4. The pin element 7 moves, in this phase, in the guide section 15 of the link guide 8. The guide section 15 of the link guide 8 is oriented transversely to the main axial direction of the hollow shaft 1. If the pin element 7 comes into contact with the counter bearing 16, the final control element 4 can be pressed downward by further rotation of the hand lever 5, presuming free mobility of the final control element 4. Through the movement downward, the top dead center position is disengaged and the intermediate element 3 transmits a retraction force to the lever arm 2. Thus, the hollow shaft 1 now also moves. In the meantime, the pin element 7 has also moved in the guide section 14. The guide section 14 is oriented parallel to the main axial direction of the hollow shaft 1. This position of the pin element 7 is supported by the force of the spring element 9. In this position, the clamping device can be completely opened, because now there is also a rotationally-fixed connection between the inner shaft 6 and the hollow shaft 1.

In order to close the clamping device again or move it into the top dead center position, the hand lever 5 is again actuated in the other rotational direction. At the beginning of the rotational movement, the pin element 7 is fixed in the guide section 14 due to the force of the spring element 9. The guide section 14 is oriented parallel to the main axial direction of the hollow shaft 1. The force of the spring element 9 must first be overcome at the moment when a further rotational movement of the hand lever 5, due to the toggle lever mechanism, is no longer sufficient to move the final control element 4 further upward. Thus, the pin element 7 can reach the guide section 15, which is oriented transversely to the main axial direction of the hollow shaft 1. Arriving there, it can also come into contact with the intermediate element 3 or a lower edge of the intermediate element 3, in order to press the intermediate element upward. The final control element 4 is also simultaneously drawn upward so that the top dead center position is reached.

The installation of the shaft structure is performed as follows. First, a bush 11 is press-fit on one side of the hollow shaft 1. Specifically, the bush is positioned on the outer edge that is also used for the rotationally-fixed arrangement of the clamping arm 17. Cylindrical bearing surfaces, for connection to the housing of the clamping device, are provided in each case between the two edges and the lever arm 2.

Next, the spring element 9, preferably a coiled compression spring, is plugged onto the inner shaft 6. The inner shaft 6 is inserted into the hollow shaft 1. The hollow shaft 6 is still bush-free on one side. The pin element 7 is guided through the link guide 8 and screwed into a corresponding threaded hole on the inner shaft 6. Finally, a bush 11 is also press-fit onto the previously bush-free side of the hollow shaft 1. The hand lever 5 can be fastened in a rotationally-fixed manner on the inner shaft 6 on one of the two sides.

The description of the disclosure is merely exemplary in nature and thus, variations that do not depart from the gist of the disclosure are intended to be within the scope of the disclosure. Such variations are not to be regarded as a departure from the spirit and scope of the disclosure.

What is claimed is:

1. A clamping device comprising:

a hollow shaft rotatably mounted in a housing;

a clamping element is coupled with the hollow shaft, a lever arm is coupled with the hollow shaft to provide a toggle lever mechanism;

an intermediate element is articulated on one side with the lever arm, the intermediate element is articulated on the other side with an axially movable final control element of a drive element;

an inner shaft, including a hand lever, is arranged in the hollow shaft, the inner shaft includes a pin element, the pin element extends through a link guide on the hollow shaft, the inner shaft can be operationally linked to the toggle lever mechanism; and a spring element tensions the inner shaft against the hollow shaft in a main axial direction, the spring element is arranged in the interior of the hollow shaft.

2. The clamping device according to claim 1, further comprising a ring gap space to accommodate the spring element provided between the hollow shaft and the inner shaft.

3. The clamping device according to claim 1, further comprising at least one bush arranged between the hollow shaft and the inner shaft.

4. The clamping device according to claim 3, wherein the bush acts as a counter bearing for the spring element.

5. The clamping device according to claim 3, wherein the bush is connected in a friction-locked manner to the hollow shaft.

6. The clamping device according to claim 1, wherein the inner shaft has a shaft shoulder as a counter bearing for the spring element.

7. The clamping device according to claim 6, wherein the shaft shoulder is a cylindrical contact surface for the inner wall of the hollow shaft.

8. The clamping device according to claim 6, wherein the shaft shoulder has an external diameter matching with the internal diameter of the hollow shaft.

9. The clamping device according to claim 6, wherein the pin element is arranged on the inner shaft in the area of the shaft shoulder.

10. The clamping device according to claim 1, wherein the spring element comprises a coiled compression spring.

* * * * *